(12) United States Patent  
Noldus (10) Patent No.: US 10,015,729 B2  
(45) Date of Patent: Jul. 3, 2018

(54) PROVIDING ACCESS TO A GPRS NETWORK

(71) Applicant: TELEFONAKTIEBOLAGET LM ERICSSON (PUBL), Stockholm (SE)

(72) Inventor: Rogier Noldus, Goirle (NE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/419,308

(22) Filed: Jan. 30, 2017

(65) Prior Publication Data

US 2017/0238242 A1    Aug. 17, 2017

Related U.S. Application Data

(63) Continuation of application No. 13/128,722, filed as application No. PCT/EP2008/065662 on Nov. 17, 2008, now abandoned.

(51) Int. Cl.
| | |
|---|---|
| *H04W 48/16* | (2009.01) |
| *H04W 48/08* | (2009.01) |
| *H04W 60/00* | (2009.01) |
| *H04W 8/18* | (2009.01) |
| *H04W 48/18* | (2009.01) |

(52) U.S. Cl.
CPC ............ *H04W 48/16* (2013.01); *H04W 8/18* (2013.01); *H04W 48/08* (2013.01); *H04W 60/00* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 6,871,069 B1 | 3/2005 | Cho | |
| 7,042,855 B1 | 5/2006 | Gilchrist et al. | |
| 7,313,108 B2 * | 12/2007 | Scobbie | H04L 12/14 370/235 |
| 7,383,044 B2 | 1/2008 | Blecker et al. | |
| 7,466,652 B2 * | 12/2008 | Lau | H04L 41/0866 370/230.1 |
| 7,587,209 B2 * | 9/2009 | Bianconi | H04W 4/14 370/328 |
| 7,801,074 B2 * | 9/2010 | Kim | H04W 28/24 370/231 |
| 2002/0093936 A1 * | 7/2002 | Chuah | H04L 29/06 370/349 |
| 2002/0132611 A1 * | 9/2002 | Immonen | H04W 28/16 455/414.1 |

(Continued)

FOREIGN PATENT DOCUMENTS

WO    2002/073998 A    9/2002

*Primary Examiner* — Hicham Foud (57) ABSTRACT

Methods and devices for providing a device access to a General Packet Radio Service (GPRS) network are described. The GPRS network comprises a control node for controlling the access. The control node performs the steps of receiving a service request from the device, the service request comprising a device identifier, obtaining a group profile comprising a group identifier identifying a plurality of devices, selecting the group profile for serving the device, if the device identifier corresponds to the group identifier, and establishing a connection based on the group profile in accordance with the service request.

24 Claims, 5 Drawing Sheets

(56) References Cited

U.S. PATENT DOCUMENTS

| | | | |
|---|---|---|---|
| 2002/0161833 A1 | 10/2002 | Niven et al. | |
| 2003/0027581 A1* | 2/2003 | Jokinen | H04W 8/04 455/456.1 |
| 2003/0108015 A1* | 6/2003 | Li | H04L 41/0893 370/338 |
| 2003/0143996 A1* | 7/2003 | Peglion | H04W 8/06 455/432.1 |
| 2004/0243720 A1* | 12/2004 | Haumont | H04L 29/06 709/245 |
| 2005/0144632 A1* | 6/2005 | Mears | H04H 60/31 725/15 |
| 2005/0180382 A1* | 8/2005 | Kim | H04W 48/18 370/349 |
| 2006/0023663 A1* | 2/2006 | Kim | H04W 28/24 370/329 |
| 2007/0002868 A1* | 1/2007 | Qian | H04W 28/24 370/395.21 |
| 2007/0004380 A1* | 1/2007 | Ylikoski | H04W 4/24 455/405 |
| 2007/0032232 A1* | 2/2007 | Bleckert | H04W 12/06 455/433 |
| 2007/0060097 A1* | 3/2007 | Edge | H04L 29/06027 455/404.1 |
| 2007/0156846 A1* | 7/2007 | Seward | H04M 3/5191 709/219 |
| 2007/0238456 A1* | 10/2007 | Robins | G01D 4/002 455/422.1 |
| 2007/0249362 A1* | 10/2007 | Robins | H04W 8/205 455/452.2 |
| 2008/0101454 A1* | 5/2008 | Luff | H04N 7/17309 375/240 |
| 2009/0086667 A1* | 4/2009 | Sitomaniemi | H04W 76/045 370/328 |
| 2009/0088147 A1* | 4/2009 | Bu | H04L 63/1416 455/423 |
| 2010/0135204 A1* | 6/2010 | Witzel | H04L 67/14 370/328 |
| 2011/0126222 A1* | 5/2011 | Wright | G06Q 30/02 725/14 |

* cited by examiner

PROVIDING ACCESS TO A GPRS NETWORK

RELATED APPLICATIONS

This application is a continuation of U.S. patent application Ser. No. 13/128,722, filed May 11, 2011, which is a national stage application, filed under 35 U.S.C. § 371, that claims priority from International Application PCT/EP2008/065662, filed Nov. 17, 2008, the contents of which are incorporated herein by reference.

TECHNICAL FIELD

The present invention relates to providing access for devices to a General Packet Radio Service (GPRS) network.

BACKGROUND

Telemetric devices are used for remote measuring and transmitting data, such as measurement information, to a central control unit. Exemplary applications of telemetry are automatic meter reading, patient monitoring, traffic monitoring and control, remote weather stations, resource distribution monitoring.

Typically a telemetric device communicates with the central control unit via a radio interface. GPRS is a technology that may be used for data communication between the telemetric device and the central control unit. GPRS and its third and fourth generation evolution is nowadays considered the leading standard for wireless data communication, making this technology the preferred choice for many system vendors and operators. GPRS is specified for example in $3^{rd}$ Partnership Project (3GPP) Technical Specification 23.060 version 7.5.0 and in 3GPP TS 44.065, version 7.0.0.

In order to enable a telemetric device to connect to a GPRS network, it must be equipped with GPRS communication capability, i.e. a subscriber identity module (SIM) card and a radio unit for wireless connection. Furthermore the telemetric device must be provided with a subscription with the GPRS network operator. The telemetric device behaves like a normal GPRS subscriber, i.e. it attaches to the GPRS network and establishes a Packet Data Protocol (PDP) context for data communication. A PDP context describes the characteristics of a data session between a device and the GPRS network. It refers to a data record comprising session information for an active GPRS session, for the purpose of exchanging data between said device and a service or application in the internet. The GPRS attach procedure is executed whenever a GPRS enabled device is switched on and needs to inform the network about its presence and capabilities. The GPRS attach procedure is initiated by the device and involves signaling between the device and nodes in a GPRS network, such as the serving GPRS support node (SGSN), home location register (HLR) and equipment identity register (EIR). The GPRS attach procedure constitutes exchange of messages for authentication of the device and the subscription, indicating supported ciphering algorithms and other capabilities of the device, and for performing a location update of the device.

According to the state of the art each telemetric device is treated as an individual GPRS subscriber. Each of the corresponding subscriptions is stored and maintained in a subscriber database, such as the Home Location Register (HLR). The number of telemetric devices having a GPRS subscription is rapidly growing and so is the number of data transmissions over the GPRS network per telemetric device. Hence, the signaling resulting from the GPRS attach procedure that is executed for each telemetric device puts a high load on the network. Another disadvantage is that the significant increase of the number of subscriptions required for the telemetric devices overloads the resources of the HLR.

SUMMARY

It is therefore an object of the invention to provide methods, devices, and computer programs that improve GPRS access to devices.

This object is achieved by the method, device, computer program and a computer-readable medium product as described in the independent claims. Advantageous embodiments are described in the further claims.

In an embodiment a method for providing a device access to a General Packet Radio Service, GPRS, network is disclosed. The GPRS network comprises a control node for controlling the access. The control node receives from a device a service request. The service request comprises a device identifier. The control node obtains a group profile comprising a group identifier identifying a plurality of devices. The control node selects the group profile for serving the device, if the device identifier corresponds to the group identifier. The control node establishes a connection based on the group profile in accordance with the service request.

The embodiments of the invention enable providing a device access to a GPRS network. The control node receives a service request from the device comprising a device identifier. Based on the device identifier the control node selects a group profile comprising a group identifier identifying a plurality of devices. The group profile is valid for the plurality of devices. The group profile is selected by the control node for serving the device if the device identifier corresponds to the group identifier. Now the control node is enabled to establish a connection for the device according to the group profile that is selected based only on the device identifier received in the service request. Hence, no further signaling is required between the device and the GPRS network for attaching the device. The group profile is obtained once by the control node and enables the control node to use the group profile for a plurality devices that send a service request. Hence no signaling is necessary between the control node and e.g. the HLR and EIR for serving each service request from each individual device, saving valuable network resources. In other words, the GPRS attach procedure known from the state of the art has become obsolete by the embodiments of the invention. Furthermore, since the group profile is valid for a plurality of devices, no individual user profiles need to be maintained for each device in the HLR.

In a further embodiment a control node is disclosed. The control node comprises a receiving unit for receiving messages, a transmitting unit for transmitting messages, a processing unit for controlling further units and for processing messages and information. The receiving unit is adapted to receive from a device a service request comprising a device identifier. The processing unit is adapted to process the service request. The processing unit is further adapted to obtain a group profile comprising a group identifier identifying a plurality of devices. The processing unit is further adapted to select the group profile for serving the device, if the device identifier corresponds to the group identifier. The processing unit is further adapted to initiate, via the transmitting unit, the establishment of a connection based on the group profile in accordance with the service request.

The invention furthermore concerns a computer program loadable into a processing unit of an interface node to perform any of the steps of the aforementioned methods when operated at the interface node. The computer program can be stored on a computer readable medium. The computer-readable medium can be a permanent or rewritable memory within the interface node or located externally. The computer program can be also transferred to the control node for example via a cable or a wireless link as a sequence of signals.

In the following, detailed embodiments of the present invention shall be described in order to give the skilled person a full and complete understanding. However, these embodiments are illustrative and are not intended to be limiting.

DETAILED DESCRIPTION

Figure 1:
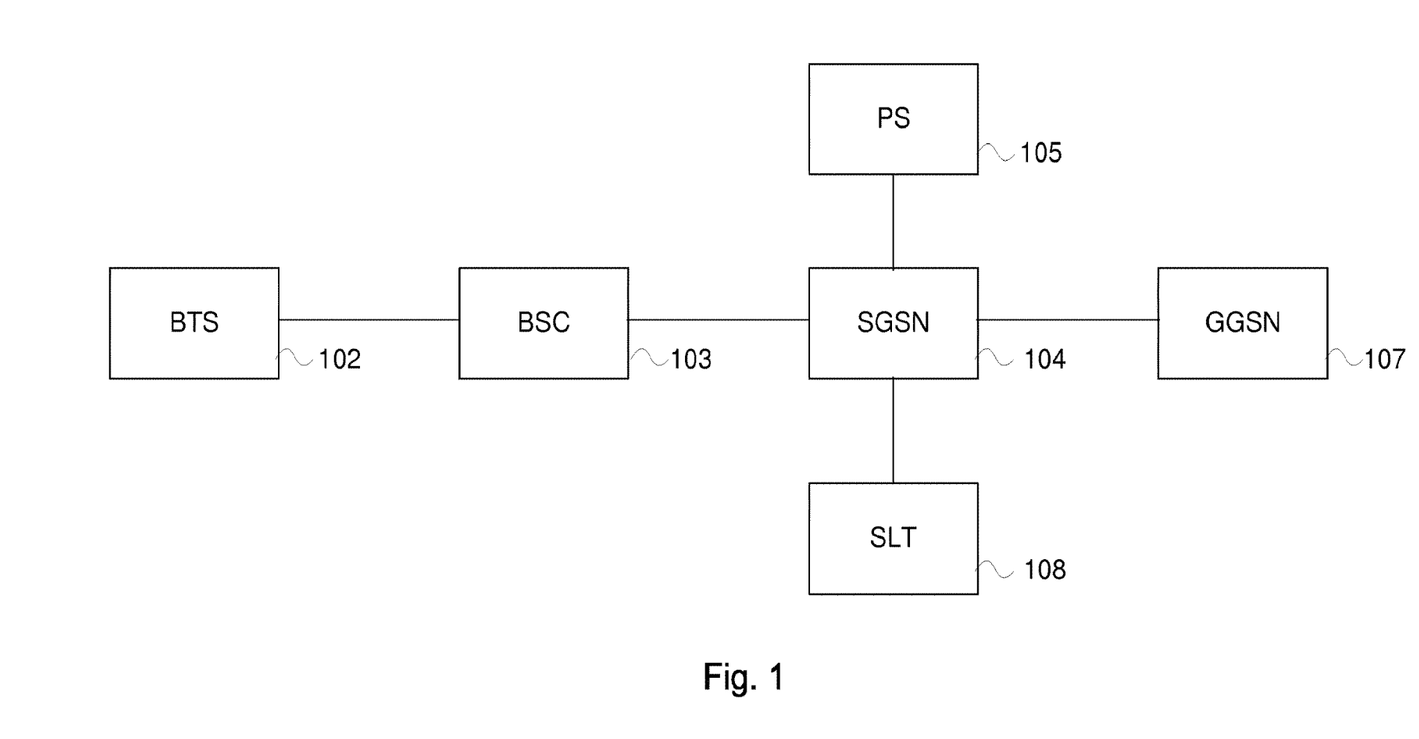
FIG. 1 shows an exemplary arrangement of nodes in a GPRS network for providing access, comprising a serving GPRS support node (SGSN) according to an embodiment of the invention.

FIG. 1 depicts an arrangement in a GPRS network in an exemplary embodiment. Depicted are a base transceiver station BTS102, a base station controller BSC103, a serving GPRS support node SGSN104, a provisioning system PS105, a gateway GPRS support node GGSN107 and a SGSN selector function SLT108.

The serving GPRS support node SGSN104 handles all packet switched data within the network, e.g. the mobility management and authentication of the user terminals. The serving GPRS support node SGSN104 performs similar functions as the mobile switching center (not depicted) for voice traffic. The serving GPRS support node and the mobile switching center may be co-located or may share a subscriber register.

The serving GPRS support node SGSN104 is connected to the base station controller BSC103. The serving GPRS support node SGSN104 is the service access point to the GPRS network for the user. On the other side the serving GPRS support node SGSN104 relays the data to and from the relevant gateway GPRS support node. The serving GPRS support node SGSN104 handles the protocol adaptation between the Internet Protocol (IP) used in the backbone network and the sub-network-dependent convergence protocol (SNDCP) and logical link control (LLC) protocols used between the serving GPRS support node SGSN104 and the user terminals. These protocols handle compression and ciphering. The serving GPRS support node SGSN104 is also responsible for the authentication of GPRS user terminals. When the authentication is successful, the serving GPRS support node SGSN104 handles the registration of the user terminal to the GPRS network and takes care of its mobility management.

The gateway GPRS support node GGSN107 is responsible for the interworking between the GPRS network and external packet switched networks, like the Internet and X.25 networks. From the external networks' point of view, the gateway GPRS support node GGSN107 is a router to a sub-network, because it hides the GPRS infrastructure from the external network. When the gateway GPRS support node GGSN107 receives data addressed to a specific user terminal, it checks whether the user terminal is active by virtue of having a data session active through this GPRS support node. If this is the case, the gateway GPRS support node GGSN107 forwards the data to the SGSN serving the user terminal, but if the user terminal is inactive, the data are discarded, or the GGSN may initiate the establishment of a PDP Context from the device, as described further on for a service node using the SGSN selector function, enabling the GGSN to send the data to the device, via the SGSN. On the other hand, mobile-originated packets are routed to the right network by the gateway GPRS support node GGSN107. The gateway GPRS support node GGSN107 keeps a record of active user terminals and the SGSN the user terminals are attached to.

The base transceiver station BTS102 is responsible for the radio contact with a user terminal. It comprises an antenna and the radio equipment necessary to communicate by radio with the user terminal. Each base transceiver station in a telecommunications network covers a defined area, known as a cell. The base transceiver station BTS102 is under control of the base station controller BSC103, which is in turn under control of the serving GPRS support node SGSN104. The collection of cells falling under the control of a serving GPRS support node is known as the location area.

The base station controller BSC103 is in control of and supervises a number of base transceiver stations, of which only is depicted the base transceiver station BTS102. The base station controller BSC103 is responsible for the allocation of radio resources to a mobile call and for the handovers that are made between the base transceiver stations under its control, as well as for handovers that are made to a base transceiver station that is controlled by another base station controller.

The provisioning system PS105 is responsible for maintaining user information, such as user profiles. A user profile comprises a subscriber identifier, for example an International Mobile Subscriber Identity (IMSI), a device identifier of the user terminal associated to the user, for example an International Mobile Equipment Identity (IMEI), GPRS subscription data, and several indicators concerning access and charging. Usually the provisioning system PS102 provisions a subscriber database, such as the home location register (HLR), with user information.

The SGSN selector function SLT208 keeps a record of active user terminals, i.e. user terminals having an active data session, and an indication of the corresponding serving SGSN support node that is serving a user terminal. The SGSN selector function SLT108 may be interrogated for example by an application running on a service node in the GPRS network, when the application is to send data to the user terminal. The SGNS selector function SLT208 provides the service node with the indication of the serving SGSN support node.

Figure 2A:
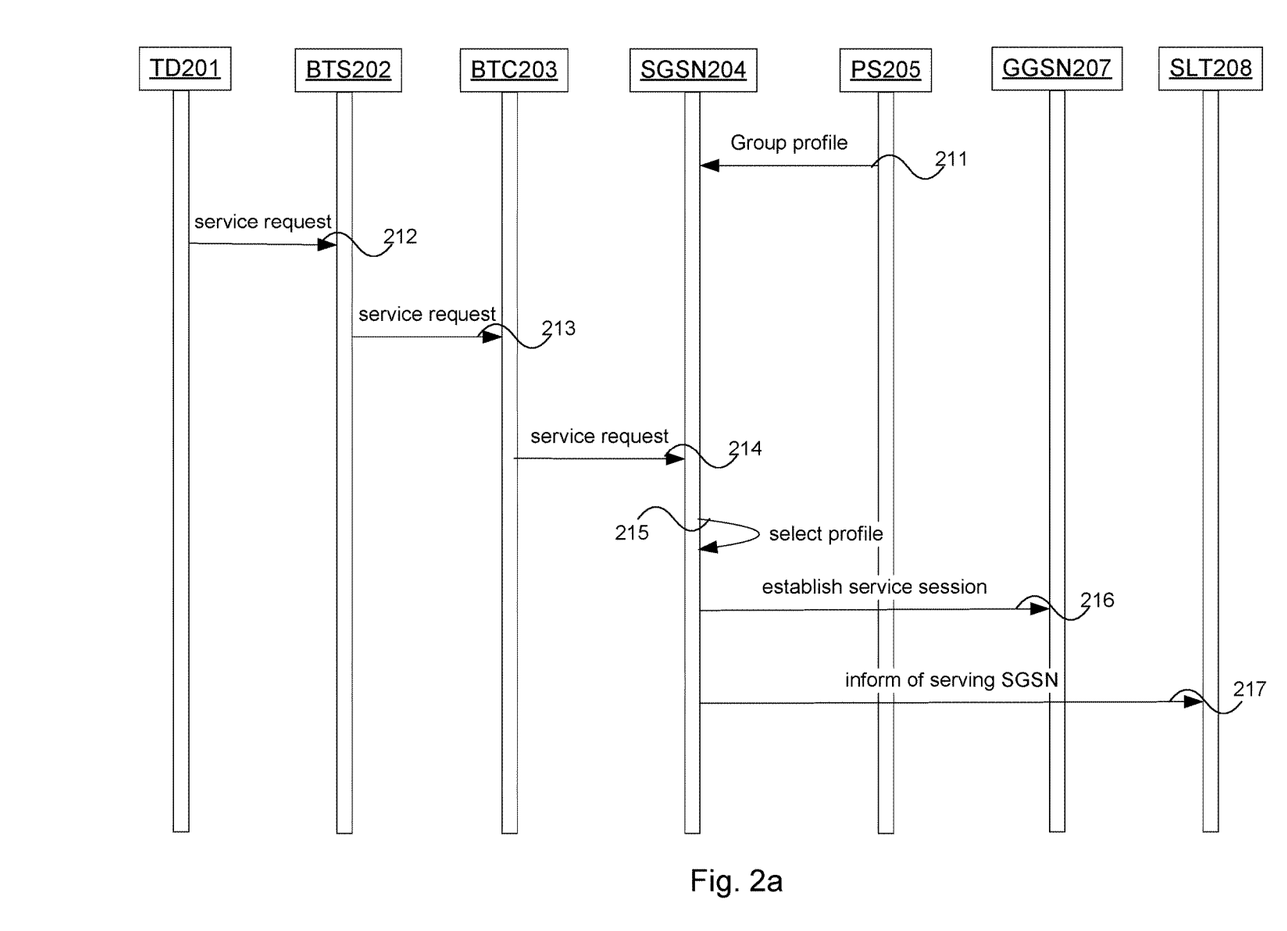
FIG. 2a shows a first sequence diagram depicting exemplary messages exchanged in the GPRS network of FIG. 1 according to a first exemplary embodiment of the invention.

FIG. 2a depicts a sequence diagram showing messages exchanged in a GPRS network in a first exemplary embodiment. The sequence diagram provides exemplary messages that are exchanged between the nodes shown under FIG. 1. Shown in FIG. 2a are a device TD201 (not shown in FIG. 1) for example a user terminal or a telemetric device, a base transceiver station BTS202, a base station controller BSC203, a serving GPRS support node SGSN204, a provisioning system PS205, a gateway GPRS support node GGSN207 and a SGSN selector function SLT208.

The device TD201 can be any apparatus that is equipped with a GPRS communication capability such as a subscriber identity module (SIM) card and radio equipment to communicate by radio with the base transceiver station BTS202.

In step 211 the provisioning system PS205 sends a group profile to the serving GPRS support node SGSN204. The group profile is similar to a regular user profile, but applies to a group of devices instead of a single device. In order to identify the group of devices for which the group profile is applicable, the group profile comprises a subscriber identifier and a device identifier that are associated to the group of devices instead of a single device. For example, the subscriber identifier comprises an IMSI range and the device identifier comprises an IMEI range. The IMSI range is the common part of the individual IMSIs allocated to all devices in the group of devices. Similarly, the IMEI range is the common part of the individual IMEIs allocated to all devices in the group of devices. In the present embodiment the device DT201 is part of the group of devices. The group profile may further comprise a Packet Data Protocol (PDP) context profile valid for the group of devices. A PDP context is a data structure present on both the SGSN and the GGSN which contains the subscriber's data session information when the subscriber has an active data session. The serving GPRS support node SGSN204 may store the group profile in a local memory for later retrieval. The serving GPRS support node SGSN204 is hence provisioned with the group profile. This allows that any of the devices that are part of the group are registered at the serving GPRS support node SGSN204 for any future service data sessions.

In step 212 the device TD201 starting a session sends a message to the base transceiver station BTS202, thereby requesting a service within the session, e.g. a request for a PDP context activation. The service request sent by the device DT201 comprises its individual subscriber identity, e.g. its IMSI and its individual device identifier, e.g. its IMEI. According to a further embodiment, the service request comprises an indication of the location where the device TD201 resides. It is assumed in this embodiment that the device TD201 does not change location and hence the indication of the location is considered a fixed value. The device TD201 may for example send a location area identifier. A location area is an area within a GPRS network that is served by one specific serving GPRS support node. The location area is usually comprised of one or more cells. Alternatively, the device TD201 may send an indication of its geographic location, for example its geographic coordinates provided by a connected global positioning system (GPS) device. According to yet another embodiment, the indication of the location comprises the identifier of the cell wherein the device TD201 resides.

The base transceiver station BTS202 sends the service request to the base station controller BSC203 in step 213, for example it passes the PDP context establishment signaling transparently on to the base station controller BSC203. The base station controller BSC203 sends the service request to the serving GPRS support node SGSN204 in step 214. It may use the IMSI to select a suitable serving GPRS support node.

In step 215 the serving GPRS support node SGSN204 extracts the device identifier of device TD201 from the service request to authenticate the originator of the service request, i.e. the device TD201. According to this embodiment the serving GPRS support node searches in its local memory for a corresponding group profile having a matching device identifier, e.g. a group profile having an IMEI range matching the device identifier of device TD201. If found, the serving GPRS support node SGSN204 selects the group profile for further serving the device. As a result, the device TD201 is now attached to the network without the need of sending an explicit request for GPRS attach and the resulting signaling between the serving GPRS support node SGSN204 and the HLR and EIR (not depicted in FIG. 2a) as is required according to the state of the art. The serving GPRS support node SGSN204 instructs the gateway GPRS support node GGSN207 to establish a service session according to the service request and the group profile in step 216. The gateway GPRS support node GGSN207 may continue the establishment of the service session in accordance with known techniques. For example it may activate a PDP context for the device TD201 and transmit data towards a service node (not depicted in FIG. 2a). Then the device TD201 has an active data session through the network. The indication of the location of the device TD201 may be sent to the service node for future service sessions initiated by the service node towards the device.

Figure 2B:
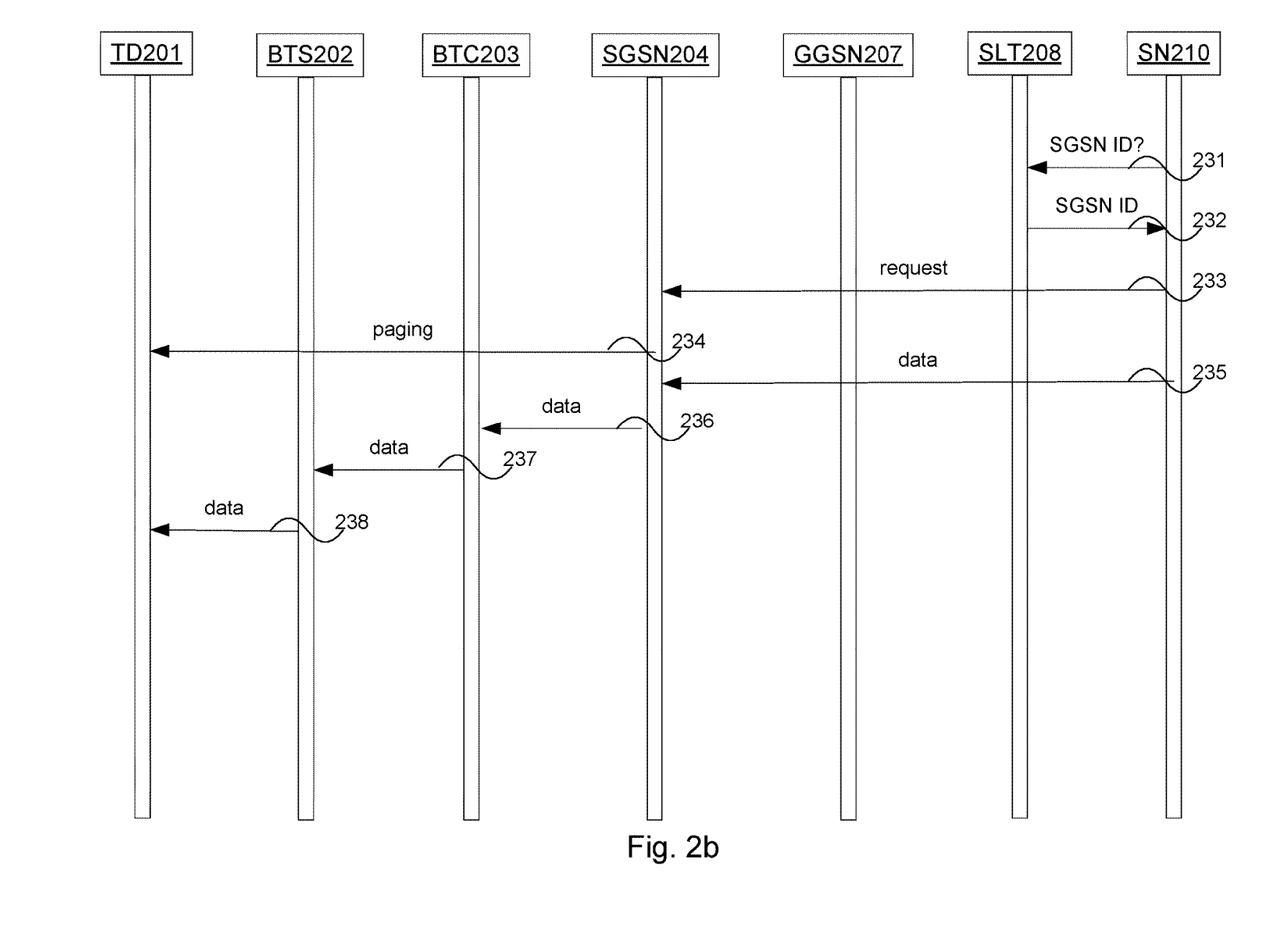
FIG. 2b shows a second sequence diagram depicting exemplary messages exchanged in a GPRS network according to a second exemplary embodiment of the invention.

In step 217 the serving GPRS support node SGSN204 sends a message to the SGSN selector function SLT208 to inform it that the serving GPRS support node SGSN204 is serving the device TD201. The message may comprise an indication of the location of the device TD201. Any service node (not depicted in FIG. 2a) initiating a future service session towards the device TD201 is now able to identify the serving GPRS support node SGSN204 by querying the SGSN selector function SLT208. An exemplary embodiment of a service session initiated by a service node is provided with reference to FIG. 2b The sequence diagram shown under FIG. 2b provides a similar arrangement of nodes in a telecommunications network to the arrangement of FIG. 2a, but in addition comprises a service node SN210. Furthermore, the provisioning system PS205 is no longer shown in the arrangement of FIG. 2b.

The service node SN210 can be any node of the telecommunications network that delivers services to end users or user terminals respectively, for example an application server. An application server is a server that hosts an API (Application Programming Interface) to expose services for use by other applications. In the example of telemetry, the service node SN210 may be a central control unit collecting measurement data from the telemetric device and sending instructions to the telemetric device.

According to the exemplary embodiment of FIG. 2b, the service node SN210 initiates a service session towards the device TD201 in step 231. For example the service node SN210 sends a request for PDP context establishment. According to this embodiment, the service node SN210 sends the request to the SGSN selector function SL208. The request comprises a subscriber identifier, a device identifier of the device TD201 and optionally an indication of the location of the device TD201. The indication of the location is known to the service node SN210 from a previous service session initiated by the device TD201 as explained with reference to FIG. 2a. The SGSN selector function SL208 maintains for each device an indication of the serving GPRS support node that is serving the device. For example it uses the indication of the location of the device to retrieve the corresponding serving GPRS support node.

In step 232 the SGSN selector function SL208 responds to the service node SN210 with an indication of the serving GPRS support node SN204.

In step 233 the service node SN210 sends the request for service session establishment to the serving GPRS support node SGSN204 as indicated in step 232, e.g. it sends a request for PDP context activation, by means of sending a Packet Data Unit (PDU) notification request, implying the request for paging the device for establishing a data session. The request comprises the device identifier and optionally the indication of the location of the device TD201.

The serving GPRS support node SGSN204 sends in step 234 a paging request to the indicated location of the device TD201 via the base station controller BSC203 and the base transceiver station BTS202. The paging request is further based on the device identifier of device TD201. Since the device TD201 can be assumed not to change location, the indication of the location may be the identifier of the exact cell where the device TD201 resides. This allows that the paging request can be restricted to the indicated cell. If the GPRS support node SGSN204 did not receive an indication of the location of the device TD201 in step 233, then it sends in step 234 the paging request to the entire location area served by the GPRS support node SGSN204 according to the prior art. Resulting from the paging request, the device TD201 will initiate the establishment of a PDP context, as described earlier.

In steps 235 to 238, the service node SN210 starts transmitting data towards the device TD201 via respectively the gateway GPRS support node GGSN207, the serving GPRS support node SGSN204, the base station controller BSC203 and the base transceiver station BTS202.

Figure 3:
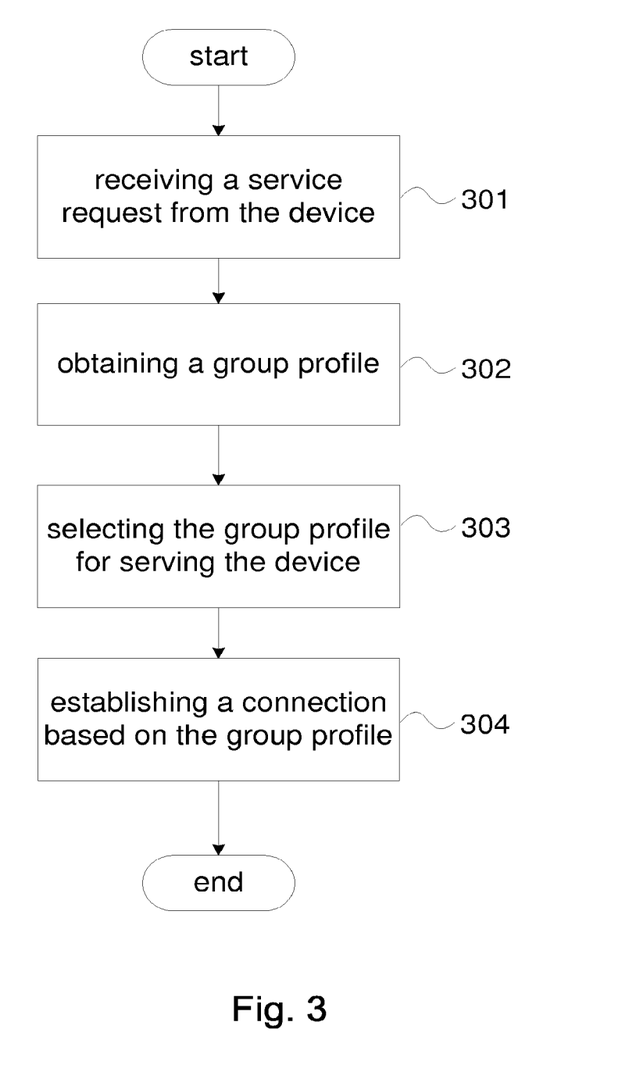
FIG. 3 shows a flow diagram of exemplary steps performed by a control node of the arrangement of FIG. 1, FIG. 2a or FIG. 2b.

FIG. 3 depicts exemplary steps performed by the control node of FIGS. 2a and 2b according to an embodiment of the invention.

In a first step 301 the control node receives from a device a service request. The service request comprises a device identifier.

In a second step 302 the control node obtains a group profile comprising a group identifier identifying a plurality of devices.

In a third step 303 the control nodes selects the group profile for serving the device, if the device identifier corresponds to the group identifier.

In a fourth step 304 the control node establishes a connection based on the group profile in accordance with the service request.

The method may end here or may continue with any of the steps described herein.

In an embodiment the step of selecting replaces a GPRS attach procedure for the device. This has the advantage that the signaling in the network resulting from a GPRS attach procedure is avoided.

In an embodiment the step of selecting is performed in response to the service request. This has the effect that the service request as such initiates providing access to the GPRS network, without having the need for sending a preceding request for a GPRS attach procedure from the device towards the network, lowering signaling between the device and the network.

In an embodiment the step of obtaining comprises receiving the group profile from a provisioning node.

In an embodiment the service request further comprises an indication of the location of the device. This has the advantage that the location of the device is known to the relevant nodes in the network such as a service node that initiates a future session towards the device. Knowing the location beforehand allows direct paging of the device without wasting resources on paging unnecessary cells. The device TD201 may for example send a location area identifier. Alternatively, the device TD201 may send an indication of its geographic location, for example its geographic coordinates provided by a connected global positioning system (GPS) device. According to yet another embodiment, the indication of the location comprises the identifier of the cell wherein the device TD201 resides.

In an embodiment the device comprises a telemetric device.

In an embodiment the control node comprises a Serving GPRS Support Node (SGSN).

In an embodiment the group profile is created at the provisioning node.

In an embodiment the service request comprises a request for Packet Data Protocol context activation.

In an embodiment the step of establishing a connection comprises activation of a Packet Data Protocol context.

Figure 4:
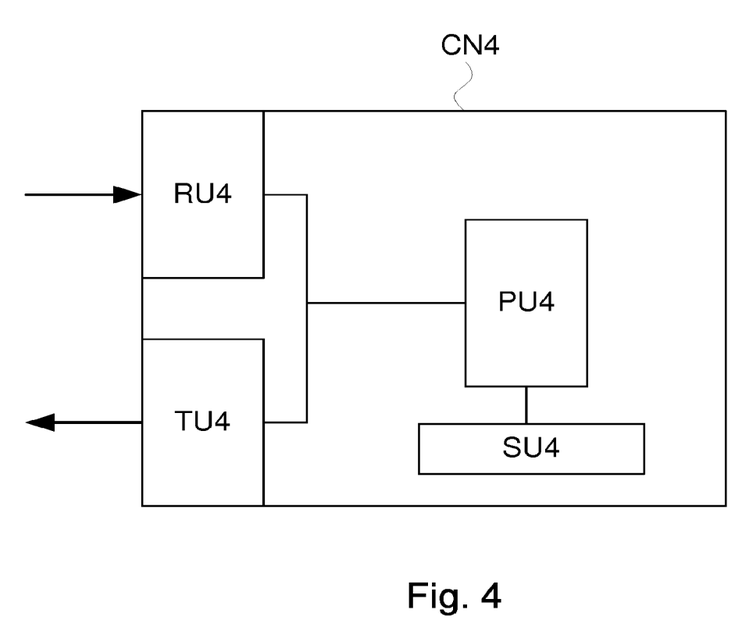
FIG. 4 shows an exemplary block diagram of the control node of FIG. 3.

FIG. 4 depicts an embodiment of the control node SGSN204 of FIG. 3 comprising a receiving unit RU4 for receiving messages, a transmitting unit TU4 for transmitting messages, a processing unit PU4 for controlling further units and for processing messages and information, and preferably a storage unit SU4 for storing and/or obtaining of stored information.

The receiving unit RU4 may be adapted to receive from a device a service request comprising a device identifier. The processing unit PU4 may be adapted to process the service request. Furthermore the processing unit PU4 may be adapted to obtain a group profile comprising a group identifier identifying a plurality of devices. The processing unit PU4 may further be adapted to select the group profile for serving the device, if the device identifier corresponds to the group identifier. Further the processing unit PU4 may be adapted to initiate, via the transmitting unit TU4, the establishment of a connection based on the group profile in accordance with the service request.

In an embodiment the processing unit PU4 may be adapted to select the group profile instead of executing a GPRS attach procedure for the device.

In an embodiment the processing unit PU4 may be adapted to select the group profile in response to the service request.

In an embodiment the processing unit PU4 may be adapted to obtain the group profile from a provisioning node via the receiving unit RU4. The receiving unit RU4 may be adapted to receive the group profile from the provisioning node.

In an embodiment the service request further comprises an indication of the location of the device. The processing unit PU4 may be adapted to process the indication of the location of the device. In particular, the processing unit PU4 may be adapted to extract the indication of the location of the device from the service request.

In an embodiment the device comprises a telemetric device.

In an embodiment the control node comprises a Serving GPRS Support Node (SGSN).

In an embodiment the group profile is created at the provisioning node.

In an embodiment the service request comprises a request for Packet Data Protocol context activation.

In an embodiment the processing unit PU4 may be adapted to establish a connection by activating a Packet Data Protocol context.

The invention claimed is:

1. A method for controlling access to a General Packet Radio Service (GPRS) network, the GPRS network comprising a control node for controlling the access, the control node performing the steps of:
    obtaining one or more group profiles associated with a plurality of devices, each group profile comprising a subscriber identifier and a device identifier associated with said plurality of devices, said subscriber identifier associated with a range of individual subscriber identities and said device identifier associated with a range of individual device identifiers;
    receiving a service request from a device, the service request comprising an individual subscriber identity and an individual device identifier; and,
        if said individual device identifier corresponds to a device identifier for one of said one or more group profiles, then 1) selecting the corresponding group profile for attaching the device to the GPRS network, and 2) establishing a GPRS session for said device based on the service request and said corresponding group profile, whereby said device is attached to the network without performing a conventional GPRS attach procedure; and,
        if said individual device identifier does not correspond to the device identifier for one of said one or more group profiles, then performing the conventional GPRS attach procedure.

2. The method according to claim 1, wherein the step of obtaining comprises receiving said one or more group profiles from a provisioning node.

3. The method according to claim 1, wherein the service request further comprises an indication of the location of the device.

4. The method according to claim 1, wherein the device comprises a telemetric device.

5. The method according to claim 1, wherein the control node comprises a Serving GPRS Support Node (SGSN).

6. The method according to claim 1, wherein the group profile is created at a provisioning node.

7. The method according to claim 1, wherein the service request comprises a request for Packet Data Protocol context activation.

8. The method according to claim 1, wherein the step of establishing a GPRS session comprises activation of a Packet Data Protocol context.

9. The method recited in claim 1, wherein the subscriber identifier comprises an International Mobile Subscriber Identity (IMSI).

10. The method recited in claim 1, wherein the subscriber identifier comprises a common portion of a range of International Mobile Subscriber Identities (IMSI) allocated to all devices in said plurality of devices.

11. The method recited in claim 1, wherein the device identifier comprises an International Mobile Equipment Identity (IMEI).

12. The method recited in claim 1, wherein the device identifier comprises a common portion of a range of International Mobile Equipment Identities (IMEI) allocated to all devices in said plurality of devices.

13. A control node for controlling access to a General Packet Radio Service (GPRS) network, said control node comprising at least one processor and at least one memory, said memory containing instructions which, when executed by said at least one processor, causes said control node to:
    obtain one or more group profiles associated with a plurality of devices, each group profile comprising a subscriber identifier and a device identifier associated with said plurality of devices, said subscriber identifier associated with a range of individual subscriber identities and said device identifier associated with a range of individual device identifiers;
    receive a service request from a device, the service request comprising an individual subscriber identity and an individual device identifier; and,
        if said individual device identifier corresponds to a device identifier for one of said one or more group profiles, then 1) select the corresponding group profile for attaching the device to the GPRS network, and 2) trigger the establishment of a GPRS session for said device based on the service request and said corresponding group profile, whereby said device is attached to the network without performing a conventional GPRS attach procedure; and,
        if said individual device identifier does not correspond to the device identifier for one of said one or more group profiles, then trigger the conventional GPRS attach procedure.

14. The control node according to claim 13, wherein obtaining one or more group profiles comprises receiving said one or more group profiles from a provisioning node.

15. The control node according to claim 13, wherein the service request further comprises an indication of the location of the device.

16. The control node according to claim 13, wherein the device comprises a telemetric device.

17. The control node according to claim 13, wherein the control node comprises a Serving GPRS Support Node (SGSN).

18. The control node according to claim 13, wherein the group profile is created at a provisioning node.

19. The control node according to claim 13, wherein the service request comprises a request for Packet Data Protocol context activation.

20. The control node according to claim 13, wherein establishing a GPRS session comprises activation of a Packet Data Protocol context.

21. The control node recited in claim 13, wherein the subscriber identifier comprises an International Mobile Subscriber Identity (IMSI).

22. The control node recited in claim 13, wherein the subscriber identifier comprises a common portion of a range of International Mobile Subscriber Identities (IMSI) allocated to all devices in said plurality of devices.

23. The control node recited in claim 13, wherein the device identifier comprises an International Mobile Equipment Identity (IMEI).

24. The control node recited in claim 13, wherein the device identifier comprises a common portion of a range of International Mobile Equipment Identities (IMEI) allocated to all devices in said plurality of devices.

* * * * *

UNITED STATES PATENT AND TRADEMARK OFFICE
CERTIFICATE OF CORRECTION

PATENT NO. : 10,015,729 B2
APPLICATION NO. : 15/419308
DATED : July 3, 2018
INVENTOR(S) : Noldus It is certified that error appears in the above-identified patent and that said Letters Patent is hereby corrected as shown below:

On the Title Page

In Item (72), under "Inventor", in Column 1, Line 1, delete "Rogier Noldus," and insert -- Rogier August Caspar Joseph Noldus, --, therefor.

In Item (72), under "Inventor", in Column 1, Line 1, delete "(NE)" and insert -- (NL) --, therefor.

In the Drawings

In Fig. 2a, Sheet 2 of 5, delete "BTC203" and insert -- BSC203 --, therefor.

In Fig. 2b, Sheet 3 of 5, delete "BTC203" and insert -- BSC203 --, therefor.

In the Specification

In Column 1, Line 7, delete "2011," and insert -- 2011, now abandoned, --, therefor.

In Column 1, Line 34, delete "3rd Partnership Project" and insert -- 3rd Generation Partnership Project --, therefor.

In Column 4, Line 53, delete "PS102" and insert -- PS105 --, therefor.

In Column 5, Line 27, delete "DT201" and insert -- TD201 --, therefor.

In Column 5, Line 43, delete "DT201" and insert -- TD201 --, therefor.

In Column 6, Line 38, delete "FIG. 2b" and insert -- FIG. 2b. --, therefor.

In Column 6, Line 59, delete "SL208." and insert -- SLT208. --, therefor.

Signed and Sealed this
Eighteenth Day of September, 2018

Andrei Iancu
*Director of the United States Patent and Trademark Office*

CERTIFICATE OF CORRECTION (continued)
U.S. Pat. No. 10,015,729 B2

In Column 6, Line 65, delete "SL208" and insert -- SLT208 --, therefor.

In Column 7, Line 3, delete "SL208" and insert -- SLT208 --, therefor.

In Column 7, Line 5, delete "SN204." and insert -- SGSN204. --, therefor.